(12) United States Patent
Chen et al.

(10) Patent No.: US 11,315,229 B2
(45) Date of Patent: Apr. 26, 2022

(54) METHOD FOR TRAINING DEFECT DETECTOR

(71) Applicants: Inventec (Pudong) Technology Corporation, Shanghai (CN); INVENTEC CORPORATION, Taipei (TW)

(72) Inventors: Yi-Chun Chen, Taipei (TW); Trista Pei-Chun Chen, Taipei (TW); Daniel Stanley Young Tan, Taipei (TW); Wei-Chao Chen, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 92 days.

(21) Appl. No.: 16/906,003

(22) Filed: Jun. 19, 2020

(65) Prior Publication Data
US 2021/0383526 A1    Dec. 9, 2021

(30) Foreign Application Priority Data

Jun. 9, 2020 (CN) .......................... 202010517963.4

(51) Int. Cl.
*G06N 3/08* (2006.01)
*G06K 9/62* (2022.01)
(Continued)

(52) U.S. Cl.
CPC .......... *G06T 7/0002* (2013.01); *G06K 9/6256* (2013.01); *G06N 3/08* (2013.01);
(Continued)

(58) Field of Classification Search
CPC combination set(s) only.
See application file for complete search history.

(56) References Cited

U.S. PATENT DOCUMENTS

2017/0169357 A1* 6/2017 Caspi .................... G06N 3/08
2018/0373980 A1* 12/2018 Huval .............. G06K 9/00805
(Continued)

OTHER PUBLICATIONS

Navid Asadizanjani , "Counterfeit Electronics Detection Using Image Processing and Machine Learning,", Nov. 18-20, 2016, IOP Conf. Series: Journal of Physics: I 2017 , Conf. Ser. 787 012023, pp. 1-5.*

*Primary Examiner* — Omar S Ismail
(74) *Attorney, Agent, or Firm* — Locke Lord LLP; Tim Tingkang Xia, Esq.

(57) ABSTRACT

A method for training a defect detector comprises: obtaining a first reference image of a first reference object, wherein the first reference object has a defect and the first reference image has a first label indicating the defect; training a reconstruction model according to a second reference image of a second reference object associated with the first reference object, wherein a defect level of the second reference object is in a tolerable range with an upper limit; obtaining a target image of a target object associated with the first reference object and the second reference object; generating a second label according to the target image, the reconstruction model and an error calculation procedure, wherein the second label comprises a defect of the target object; and training a defect detector by performing a machine learning algorithm according to the first reference image, the target image and the second label.

9 Claims, 4 Drawing Sheets

(51) Int. Cl.
*G06T 7/00* (2017.01)
*G06N 20/00* (2019.01)
(52) U.S. Cl.
CPC .............. *G06N 20/00* (2019.01); *G06T 7/97*
(2017.01); *G06T 2207/20081* (2013.01); *G06T 2207/20084* (2013.01); *G06T 2207/20224* (2013.01)

(56) References Cited

U.S. PATENT DOCUMENTS

| | | | |
|---|---|---|---|
| 2019/0035113 A1* | 1/2019 | Salvi | G06N 3/0454 |
| 2019/0096659 A1* | 3/2019 | Xu | G06F 9/30003 |
| 2019/0130279 A1* | 5/2019 | Beggel | G06N 3/0454 |
| 2019/0138786 A1* | 5/2019 | Trenholm | G06T 7/50 |
| 2020/0160598 A1* | 5/2020 | Manivasagam | G07C 5/02 |
| 2020/0175352 A1* | 6/2020 | Cha | G06N 3/08 |
| 2020/0322367 A1* | 10/2020 | Salvat Lozano | H04L 63/1433 |
| 2020/0327654 A1* | 10/2020 | Zhang | G06T 7/001 |
| 2021/0350233 A1* | 11/2021 | Saboori | G06N 3/08 |

* cited by examiner

METHOD FOR TRAINING DEFECT DETECTOR

CROSS-REFERENCE TO RELATED APPLICATIONS

This non-provisional application claims priority under 35 U.S.C. § 119(a) on Patent Application No(s). 202010517963.4 filed in China on Jun. 9, 2020, the entire contents of which are hereby incorporated by reference.

BACKGROUND

1. Technical Field

This disclosure relates to image detection and neural network model, and more particularly to a method for training a defect detector.

2. Related Art

Computers, such as laptops, tablets and the likes, need to be inspected and confirmed by quality control personnel before their final shipment to the customers. Such quality control personnel will check for scratches, dents, and other surface defects specified in an inspection-guideline documentation. If the severity of the surface defects is beyond what are allowed in the specification, the computer is then considered "failed", as opposite to "pass" in the surface defect detection test.

To detect computer appearance imperfections, it is possible to collect computer surface images, label them with defect types, and train deep learning (DL) model for inference in an automatic optical inspection (AOI) machine. Both object detection and classification are done in a supervised manner. In the case of supervised learning, conventional wisdom dictates that we collect more labeled training data, with both normal and defective samples, for better inference/testing accuracy.

More training data means more labeling work. However, training image collection and labeling require a lot of labors and can be hard due to several reasons. For example, manufacturing facilities where the computers are manufactured, are not equipped with infrastructure in collecting big data, especially large amount of image data. If such data collection and labeling tasks are outsourced, security, integrity, and confidentiality of the data can cause a great concern. More importantly, as computer life cycles become shorter and product designs become more diverse, it becomes impractical to collect and label computer surface images with sufficient diversity. Computer surface can come in any color and can come in any texture and material. In addition, there are many types of surface defects such as scratch, dent, smudge, etc. Surface defects of the same type can come in all shapes and sizes. To make matters worse, some surface defects cannot be easily categorized. There will be inevitably inconsistent labels in the training data. Conventional methods need the surface defects to be categorized/labeled correctly in the training data, in order to have good accuracy. Therefore, it's hard to collect a large amount of consistent labeled data with sufficient varieties. A product may be near the end of its lifecycle before enough training images are collected and labeled.

Therefore, if an object detector or classifier with high accuracy can be provided that requires only a small amount of labeled training data, the cost can be effectively reduced.

SUMMARY

Accordingly, this disclosure provides a method for training a defect detector to reduce the cost of providing a large amount of labeled training data.

According to an embodiment of the present disclosure, a method for training defect detector comprising: obtaining a first reference image of a first reference object, wherein the first reference object has a defect and the first reference image has a first label indicating the defect; training a reconstruction model according to a second reference image of a second reference object, wherein a defect level of the second reference object is in a tolerable range with an upper limit, and the second reference object is associated with the first reference object; obtaining a target image of a target object, wherein the target object is associated with the first reference object and the second object; generating a second label according to the target image, the reconstruction model and an error calculating procedure, wherein the second label comprises a defect of the target object; and training a defect detector by performing a machine learning algorithm according to the first reference image, the target image, and the second label.

According to an embodiment of the present disclosure, a method for training defect detector comprising: obtaining a first reference image of a first reference object, wherein the first reference object has a defect and the first reference image has a first label indicating the defect; training a defect detector by performing a machine learning algorithm according to the first reference image and the first label; training a reconstruction model according to a second reference image of a second reference object, wherein a defect level of the second reference object is in a tolerable range with an upper limit, and the second reference object is associated with the first reference object; obtaining a target image of a target object, wherein the target object is associated with the first reference object and the second object; generating a second label according to the target image, the reconstruction model and an error calculating procedure, wherein the second label comprises a defect of the target object; and calibrating the defect detector by performing the machine learning algorithm according to the target image and the second label.

In sum, the method for training defect detector proposed in the present disclosure uses only a small amount of human-labeled image data as the training data, yet achieving good inference performance.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

The method for training defect detector proposed in the present disclosure is adapted to generate a detector configured to detect a defect of the testing object.

Figure 1:
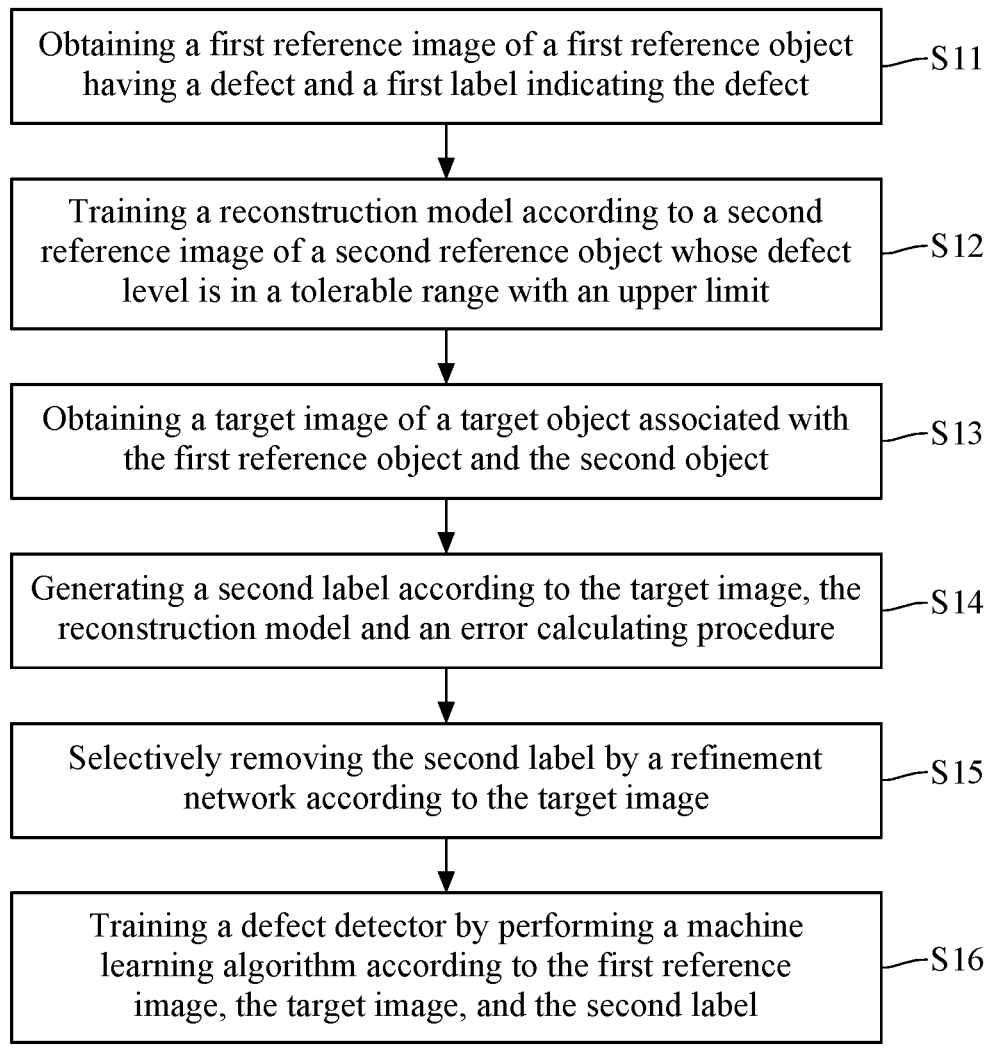
FIG. 1 is a flow chart of the method for training defect detector according to an embodiment of the present disclosure.

Please refer to FIG. 1, which illustrates a flowchart of the method for training defect detector according to an embodiment of the present disclosure. Please refer to step S11, "obtaining a first reference image of a first reference object having a defect and a first label indicating the defect". In an embodiment, the first reference object is a surface of a computer product, such as a top cover of a laptop, and the defect is a scratch, a dent, a smudge, or the like on the top cover. For another example, the first reference object is a printed circuit board (PCB), and the defect is a missing component, a skew component, or a wrong component. Practically, the first reference image may be obtained by capturing the first reference object by a camera device, and a bounding box served as the first label is added on the first reference image by human. The bounding box is configured to indicate a defect of the first reference object. The first reference object with defects is equivalent to a disqualified sample, which is used for training the defect detector to identify an existing defect type in a high accuracy.

Please refer to step S12, "training a reconstruction model according to a second reference image of a second reference object whose defect level is in a tolerable range with an upper limit". Specifically, the second reference object is associated with the first reference object. The second reference object is equivalent to a normal sample, or referred to as a tolerable sample. For example, the second reference object is the top cover of the laptop. The number and the level of defect of the reference object is in a tolerable range. Taking Table 1 for example, the tolerable range may be the defect types of the first and second levels whose upper limit includes maximal boundary values (20 mm, 2 scratches, 1 $mm^2$, and/or two dents) defined in level 2, or the tolerable range may be the defect type of the first level whose upper limit includes maximal boundary values (12 mm, 2 scratches, 0.7 $mm^2$, and/or three dents) defined in level 1. For the convenience of description, "the level of defect in a tolerable range" is referred to as "no defect".

TABLE 1

| Defect level | Level 1 | Level 2 | Level 3 |
| --- | --- | --- | --- |
| Scratch | Length: 12 mm | Length: 20 mm | Length: 25 mm |
|  | Acceptable: two | Acceptable: two | Acceptable: one |
| Dent | 0.5 $mm^2$-0.7 $mm^2$ | 0.5 $mm^2$-1 $mm^2$ | 1 $mm^2$-1.3 $mm^2$ |
|  | Acceptable: three | Acceptable: two | Acceptable: one |

The reconstruction model, also known as "generative model", is a model used to describe a normal sample. In an embodiment, the reconstruction model of step S12 is an auto-encoder. In another embodiment, the reconstruction model of step S12 is a one-class support vector machine (one-class SVM).

Please refer to step S13, "obtaining a target image of a target object associated with the first reference object and the second object". For example, the target image of the target object is captured by the camera device. The target object is such as the top cover of the laptop or the PCB. Practically, the number of the target images is greater than the number of the first reference images in step S11. The number of the target images is also greater than the number of the second reference images in step S12.

Please refer to step S14, "generating a second label according to the target image, the reconstruction model and an error calculating procedure".

Figure 2:
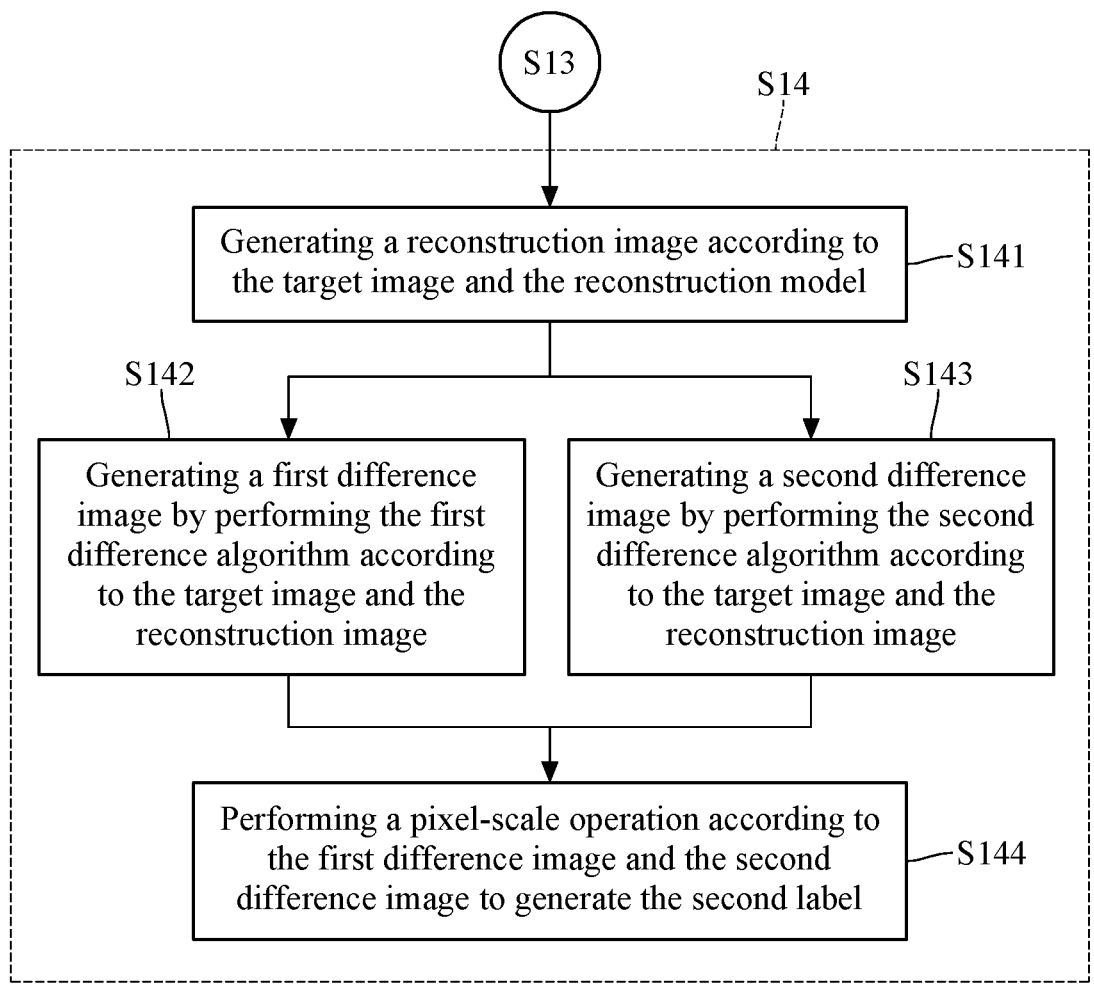
FIG. 2 is a detailed flow chart of step S14 in FIG. 1.

Please refer to FIG. 2, which illustrates a detailed flow chart of step S14 in FIG. 1. Please refer to step S141, "generating a reconstruction image according to the target image and the reconstruction model". For example, the camera device transmits the target image obtained in step S13 to a processor. The processor generates a reconstruction image according to the target image and the reconstruction model. The reconstruction image is equivalent to "a target image without defect". The manners to generate the reconstruction image includes: selecting one from the plurality of reconstruction image candidates, generating the reconstruction image by a linear combination with a plurality of feature prototypes, or outputting the reconstruction image according to image converting function, however, the present disclosure is not limited to the above examples.

There is a reconstruction error between the reconstruction image and the target image after generating the reconstruction image in step S141 if the target object of the target image had a defect. Please refer to steps S142 and S143, these two steps are error calculating procedures. Step S142 is that the processor generates a first difference image according to the target image and the reconstruction image by performing a first difference algorithm, and step S143 is that the processor generates a second difference image according to the target image and the reconstruction image by performing a second difference algorithm. The processor calculates reconstruction errors with different scales in steps S142 and S143. Steps S142 and S143 may be performed concurrently, or be performed sequentially. The present disclosure does not limit the order that the processor performs steps S142 and S143.

Figure 3:
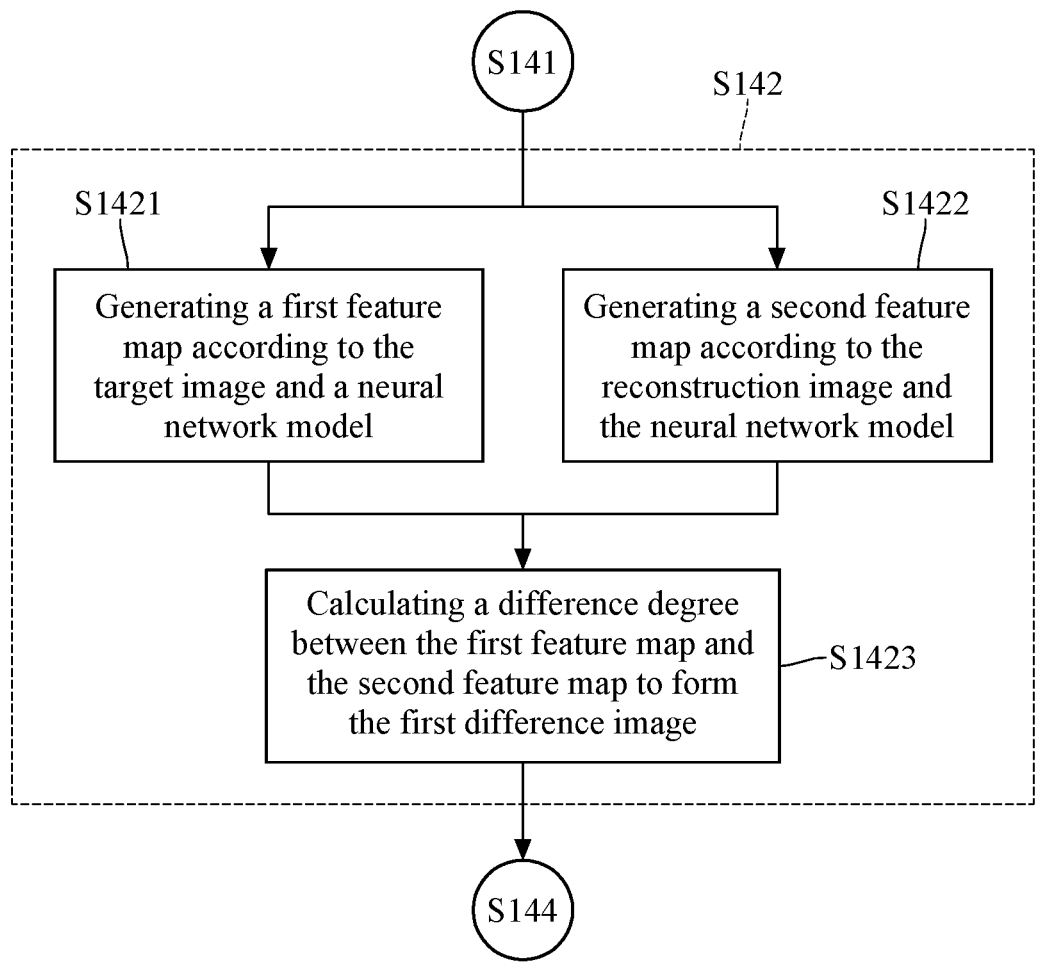
FIG. 3 is a detailed flow chart of step S142 in FIG. 2.

Please refer to FIG. 3, which illustrates a detailed flow chart of step S142 in FIG. 2.

Please refer to steps S1421 and S1422. Step S1421 refers to "generating a first feature map according to the target image and a neural network model", and step S1422 refers to "generating a second feature map according to the reconstruction image and the neural network model". Each of the first and second feature maps has one or more feature blocks respectively, these feature blocks represent the parts of the feature map that needs attention. For example, one feature block may be a rectangular patch whose length and width are 64 pixels. However, the present disclosure does not limit the size of the feature block. The feature map may be referred to as "deep feature".

In an embodiment, the neural network model used in steps S1421 and S1422 is such as SqueezeNet. In other embodiments, the neural network model is AlexNet or ResNet. In an embodiment, the neural network model is trained in advance with a plurality of images from a large visual database such as ImageNet, and the plurality of images is not associated with the target object. During a training process, every pixel of each image is used to crop out a rectangular block containing this pixel (such as a rectangular block with a length and width of 64 pixels) as the training data. Another embodiment firstly uses a plurality of images not associated with the target object to train the neural network model, and then use a plurality of images associated with the target object to fine-tune this neural network model so that improves the accuracy of feature extraction. The feature map output by the trained neural network model in the feature extraction stage is similar to the feature recognition policy of human visual perception.

Please refer to step S1423, "calculating a difference degree between the first feature map and the second feature map to form the first difference image". For example, the first difference image is generated by subtracting the first feature map and the second feature map. The first difference image is a perceptual attention map which mimics how humans compare image patches. Specifically, when humans compare the reference image and the target image, they tend to observe difference with block-scale rather than slight shift or small difference. The first algorithm described in steps S1421-1423 calculates a coarse-level reconstruction error from an angle of block view.

In general, most auto-encoder use variants of the L2 distance metric or structural similarity index (SSIM) to compute the reconstruction error between the target image and reconstruction image. However, these metrics tend to be sensitive to slight global shifts and as a result, do not work well when our focus is on texture pattern similarity instead of exact alignment. Even the level of defect of the target object in the target image is not serious, if there is a small shift between the target image and the reconstruction image, the above metrics may bring unnecessary reconstruction error. Therefore, the present disclosure adopts the first difference algorithm introduced in steps S1421-S1423 to give more importance to match higher level structure and feature representations. In overall, the first difference image generated by applying the first difference algorithm have effects such as emphasizing the region of interest (ROI) and reducing the background noise.

Please refer to step S143, "generating a second difference image according to the target image and the reconstruction image by performing a second difference algorithm". The second difference algorithm is that the processor calculates a relative error between each pixel of the reconstruction image and a respective pixel of the target image. The relative error is a pixel-wise square error of every pixel in two images or a pixel-wise absolute error of every pixel in two images. The processor performs a pixel-level calculation in this step S143 to obtain defect positions of the target object in the target images.

Please refer to step S144, "performing a pixel-scale operation according to the first difference image and the second difference image to generate a second label". In an embodiment, the pixel-scale operation is the bitwise multiplication. Specifically, in step S144, considering a position of the first difference image and the same position of the second difference image, if the processor determines that pixel values of these two positions indicate represent the defect, the first output image will keep the defect of this position. On the other hand, if the processor determines that pixel value of either the first difference image or the second difference image indicates the defect, the processor will not use a second label to label this position.

Please refer to step S15, "selectively removing the second label by a refinement network according to the target image". The refinement network comprises a classifier and a bounding box regressor. The classifier is configured to adjust a confidence estimation of the second label, and the bounding box regressor is configured to refine the size of the bounding regressor. In step S15, the second labels with low confidence estimation values will be selectively removed by setting a threshold value, and the removed second labels are usually false positives. Specifically, the processor trains a neural network model in advance according to the first reference images and the first label obtained in step S11, and the refinement network comprises two regressors after the region proposal network (RPN) in the neural network model. In an embodiment, the neural network model is Faster R-CNN. However, the present disclosure is not limited thereof.

In an embodiment, the refinement step of S15 may be neglected, and the second label generated in step S14 and the target images obtained in step S13 are directly served as the training data in step S16.

Please refer to step S16, "training a defect detector by performing a machine learning algorithm according to the first reference image, the target image, and the second label". It should be noticed that the large amount of unlabeled target images obtained in step S13 has become target images with defect-indicating labels after steps S14 and S15. Therefore, these target images and defect-indicating labels (second labels) and the first reference images including the first labels obtained in step S11 may be served as the training data of the machine learning algorithm. The machine learning algorithm used to implement a defect detection model is such as a region-based convolutional neural network (R-CNN), and said R-CNN comprises Fast R-CNN, Faster R-CNN, Mask R-CNN, you only look once (YOLO), or single shot detection (SSD).

After step S16, the trained defect detector can be used online to detect whether there is a defect on the testing object. Taking the following steps for example, obtaining a testing image, selecting a bounding box from the testing image by the defect detector and outputting a feature parameter associated with the bounding box and performing a classification algorithm according to the bounding box and the feature parameter to determine whether the testing object conforms to a specification. The testing image is an image of a testing object associated with the first reference object, the bounding box comprises a defect of the testing object, and said classification algorithm is such as support vector machine (SVM).

In an embodiment of the present disclosure, the first reference image including the first label, the target image and the second label are served as the training data for generating the defect detector in step S16.

It should be notice that the method for training defect detector according to an embodiment of the present disclosure is shown as FIG. 1, however, the order of steps S11-S16 is not limited by FIG. 1. For example, steps S11 and S12 can be performed concurrently, and thereby reducing the total time implementing the embodiment of the present disclosure. For another example, step S13 may be performed before step S12, or be performed with step S12 at the same time.

Figure 4:
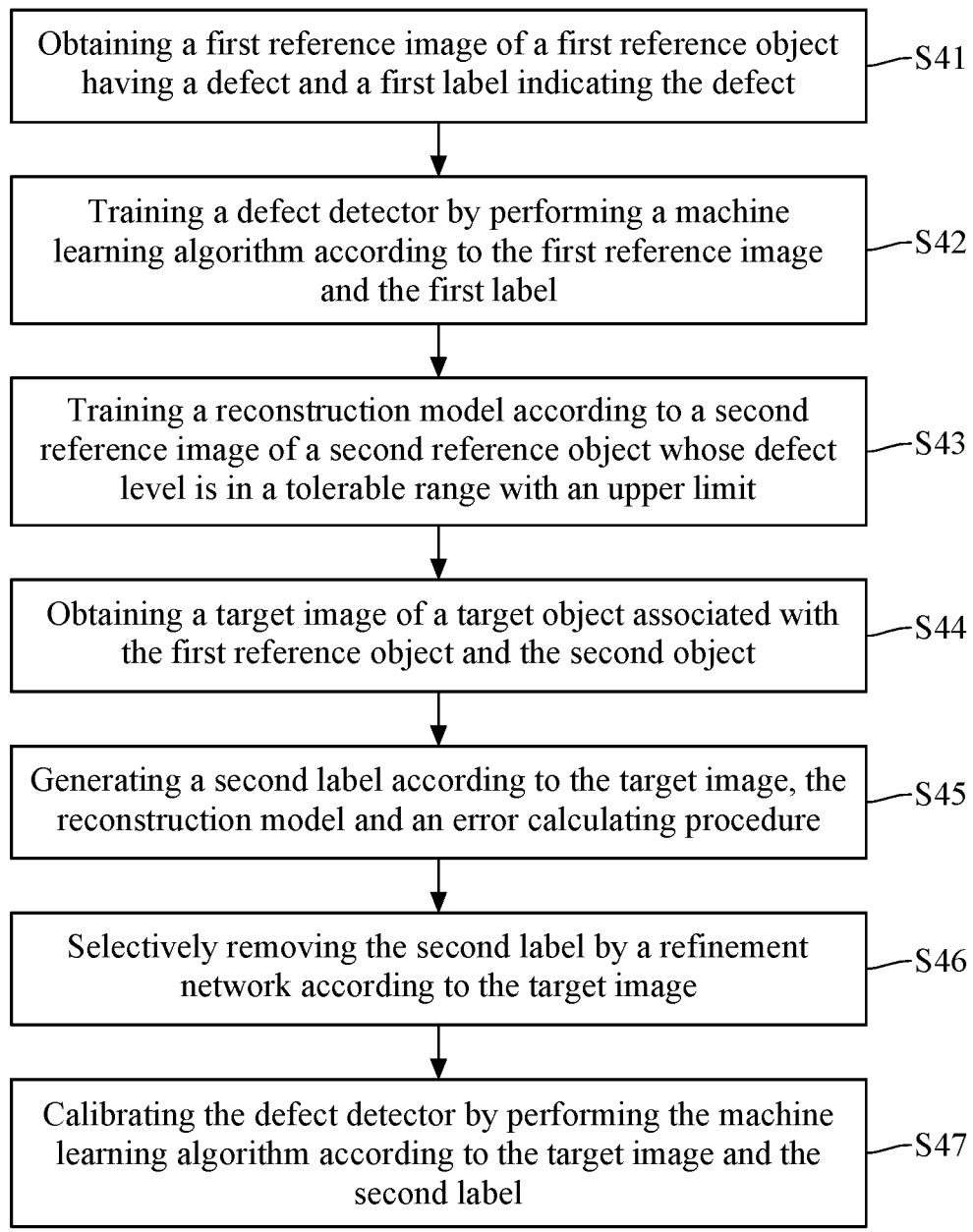
FIG. 4 is a flow chart of the method for training defect detector according to another embodiment of the present disclosure.

Please refer to FIG. 4, which illustrates a flow chart of the method for training defect detector according to another embodiment of the present disclosure. The difference between said another embodiment and previous embodiment is the times of training. Said another embodiment performs an initial training of the defect detector by the first reference image and the first label and then calibrates the defect detector generated in the initial training according to the target image and the second label. The detailed process is described as follows.

Please refer to step S41, "obtaining a first reference image of a first reference object having a defect and a first label indicating the defect". Step S41 is basically identical to step S11, and is not repeated herein.

Please refer to step S42, "training a defect detector by performing a machine learning algorithm according to the first reference image and the first label". Step S42 is similar to step S16, and the difference is that step S42 uses the data obtained in step S11 to perform the training task to generate a preliminary defect detector. Defect type detectable by this defect detector may be limited to the number of the first reference images, however, this defect detector has high correction rate when detecting a specified defect type.

Steps S43-46 are basically identical to steps S12-15 and are not repeated herein.

Please refer to step S47, "calibrating the defect detector by performing the machine learning algorithm according to the target image and the second label". This step S46 uses the target image obtained in step S44 and the second label generated in step S45 to further calibrate the defect detector trained in step S42 for improving the detecting ability regarding defects with an unknown type.

It should be noticed that the method for training defect detector according to another embodiment of the present disclosure is shown in FIG. 4, however, the order of steps S41-46 is not limited by FIG. 4. For example, steps S41-42 may be performed together with step S43 concurrently, and thereby reducing the total time implementing another embodiment of the present disclosure.

In sum, the method for training defect detector proposed in the present disclosure uses only a small amount of human-labeled image data as the training data, yet achieving good inference performance.

What is claimed is:

1. A method for training defect detector comprising:
    obtaining a first reference image of a first reference object, wherein the first reference object has a defect and the first reference image has a first label indicating the defect;
    training a reconstruction model according to a second reference image of a second reference object, wherein a defect level of the second reference object is in a tolerable range with an upper limit, and the second reference object is associated with the first reference object;
    obtaining a target image of a target object, wherein the target object is associated with the first reference object and the second object;
    generating a second label according to the target image, the reconstruction model and an error calculating procedure, wherein the second label comprises a defect of the target object; and
    training a defect detector by performing a machine learning algorithm according to the first reference image, the target image, and the second label;
    wherein the error calculating procedure comprises a first difference algorithm and a second difference algorithm, and generating the second label according to the target image, the reconstruction model and the error calculating procedure comprises:
    generating a reconstruction image according to the target image and the reconstruction model;
    generating a first difference image and a second image respectively by performing the first difference algorithm and the second difference algorithm respectively according to the target image and the reconstruction image; and
    performing a pixel-scale operation according to the first difference image and the second difference image to generate the second label.

2. The method for training defect detector of claim 1, wherein before training the defect detector by performing the machine learning algorithm according to the first reference image, the target image, and the second label, further comprising:
    training a neural network model according to the first reference image and the first label, wherein the neural network model comprises a refinement network; and
    selectively removing the second label by the refinement network according to the target image.

3. The method for training defect detector of claim 2, wherein the neural network model is Faster R-CNN and the refinement network is a classifier of the neural network model.

4. The method for training defect detector of claim 1, wherein the first difference algorithm comprises:
    generating a first feature map according to the target image and a neural network model;
    generating a second feature map according to the reconstruction image and the neural network model; and
    calculating a difference degree between the first feature map and the second feature map, wherein the first difference image comprises the difference degree.

5. The method for training defect detector of claim 1, wherein the second difference algorithm comprises: calculating a relative error according to each pixel of the reconstruction image and the target image.

6. The method for training defect detector of claim 1, wherein the pixel-scale operation is bitwise multiplication.

7. The method for training defect detector of claim 1, wherein after training the defect detector by performing the machine learning algorithm according to the first reference image, the target image, and the second label, further comprising:
    obtaining a testing image, wherein the testing image is an image of a testing object associated with the first reference object;
    selecting a bounding box from the testing image by the defect detector and outputting a feature parameter associated with the bounding box, wherein the bounding box comprises a defect of the testing object; and
    performing a classification algorithm according to the bounding box and the feature parameter to determine whether the testing object conforms to a specification.

8. A method for training defect detector comprising:
    obtaining a first reference image of a first reference object, wherein the first reference object has a defect and the first reference image has a first label indicating the defect;
    training a defect detector by performing a machine learning algorithm according to the first reference image and the first label;
    training a reconstruction model according to a second reference image of a second reference object, wherein a defect level of the second reference object is in a tolerable range with an upper limit, and the second reference object is associated with the first reference object;
    obtaining a target image of a target object, wherein the target object is associated with the first reference object and the second object;
    generating a second label according to the target image, the reconstruction model and an error calculating procedure, wherein the second label comprises a defect of the target object; and
    calibrating the defect detector by performing the machine learning algorithm according to the target image and the second label;

wherein the error calculating procedure comprises a first difference algorithm and a second difference algorithm, and generating the second label according to the target image, the reconstruction model and the error calculating procedure comprises:

generating a reconstruction image according to the target image and the reconstruction model;

generating a first difference image and a second image respectively by performing the first difference algorithm and the second difference algorithm respectively according to the target image and the reconstruction image; and performing a pixel-scale operation according to the first difference image and the second difference image to generate the second label.

9. The method for training defect detector of claim 8, wherein before calibrating the defect detector by performing the machine learning algorithm according to the target image and the second label, further comprising:

training a neural network model according to the first reference image and the first label, wherein the neural network model comprises a refinement network; and selectively removing the second label by the refinement network according to the target image.

* * * * *